United States Patent [19]

Briles

[11] Patent Number: 4,609,315
[45] Date of Patent: Sep. 2, 1986

[54] CORROSION RESISTANT DUAL TAPERED HEAD FASTENER AND PANEL COMPOSITE

[76] Inventor: Franklin S. Briles, 2640 Vista Pacific Dr., Oceanside, Calif. 92056-3599

[21] Appl. No.: 590,776

[22] Filed: Mar. 19, 1984

[51] Int. Cl.⁴ .......................................... F16B 13/04
[52] U.S. Cl. ..................... 411/43; 411/399; 411/501; 411/903; 411/914; 403/408.1
[58] Field of Search .................. 411/34–38, 411/43, 41, 399, 361, 378, 424, 426, 500, 501, 504, 506, 507; 403/408, 408.1

[56] References Cited

U.S. PATENT DOCUMENTS

| | | | |
|---|---|---|---|
| 2,647,432 | 8/1953 | Huck | 411/501 |
| 3,606,416 | 9/1971 | Hatter et al. | 403/408 |
| 3,620,119 | 11/1971 | King, Jr. et al. | 411/399 |
| 3,680,429 | 8/1972 | Briles . | |
| 3,815,220 | 6/1974 | Briles . | |
| 3,849,964 | 11/1974 | Briles . | |
| 3,908,257 | 9/1975 | Briles . | |
| 3,921,364 | 11/1975 | Briles . | |
| 3,933,025 | 1/1976 | Briles . | |
| 3,934,330 | 1/1976 | Briles . | |
| 3,941,027 | 3/1976 | Gibson, Jr. et al. | 403/408 |
| 4,000,680 | 1/1977 | Briles . | |
| 4,040,164 | 8/1977 | Briles . | |
| 4,048,708 | 9/1977 | Briles . | |
| 4,050,833 | 9/1977 | Briles . | |
| 4,142,439 | 3/1979 | Landt . | |
| 4,202,242 | 5/1980 | Champoux et al. | 411/399 |
| 4,221,041 | 9/1980 | Hufnagl et al. | 411/501 |
| 4,348,140 | 9/1982 | Bergholz et al. | 403/408 |
| 4,405,256 | 9/1983 | King, Jr. | 403/408 |
| 4,447,944 | 5/1984 | Mohrman | 411/41 |
| 4,478,544 | 10/1984 | Strand | 411/34 |

FOREIGN PATENT DOCUMENTS 581104 10/1946 United Kingdom ............... 411/399

Primary Examiner—Gary L. Smith
Assistant Examiner—Neill Wilson
Attorney, Agent, or Firm—William W. Haefliger

[57] ABSTRACT

A corrosion resistant angled head fastener is disclosed for use with at least two non-metallic panels. The panels defining a bore and a counterbore with the counterbore and a portion of the bore being in one panel and the bore extending through another panel. The fastener head has an end face with two angled sections. The first section extends forwardly of the face of the head and the second section extends forwardly of the first second. The included angle of the taper of the second section is between about 100° and about 170°. The head section is configured to fit into the counterbore of the panel.

21 Claims, 13 Drawing Figures

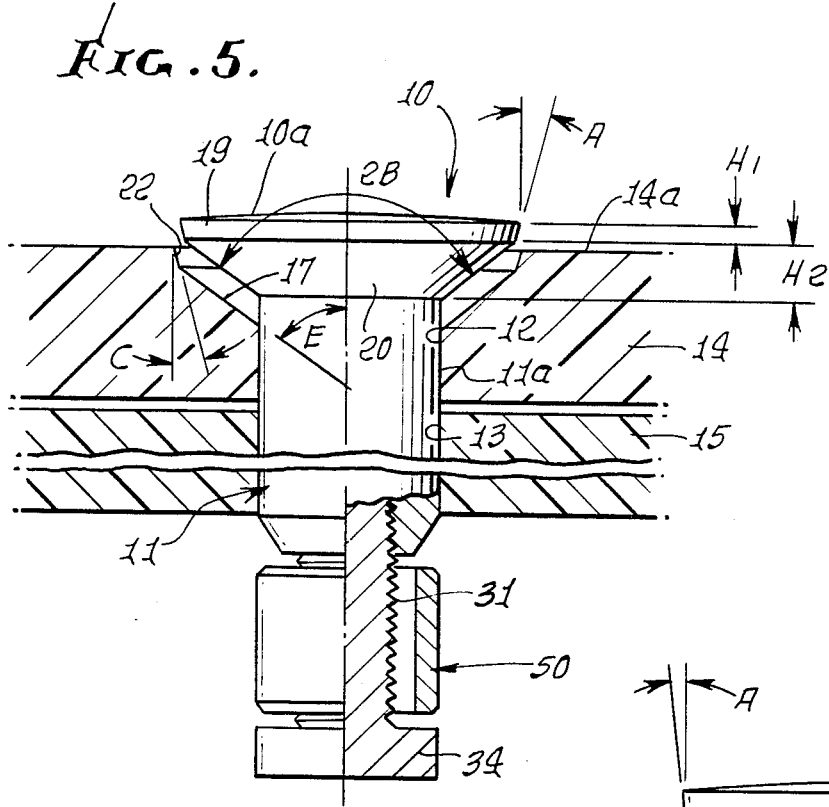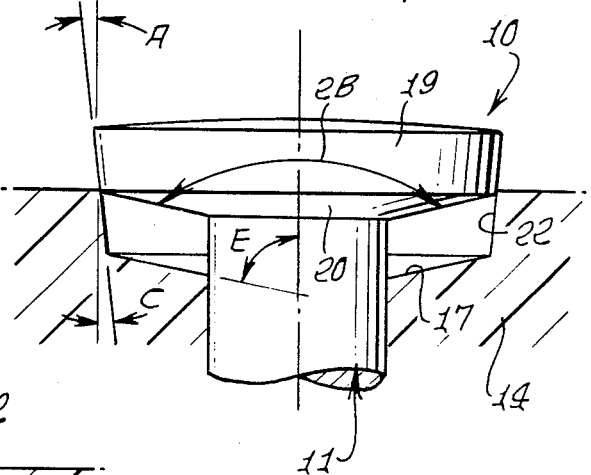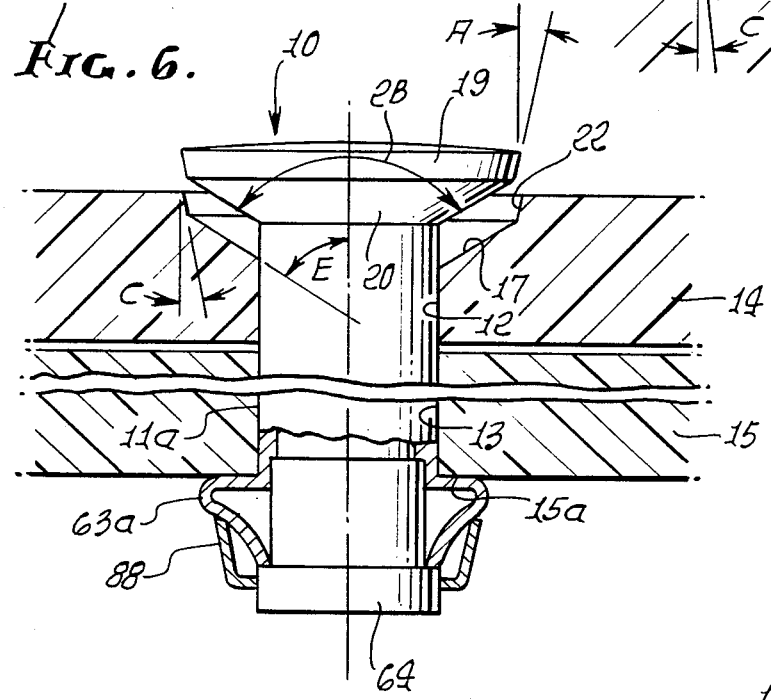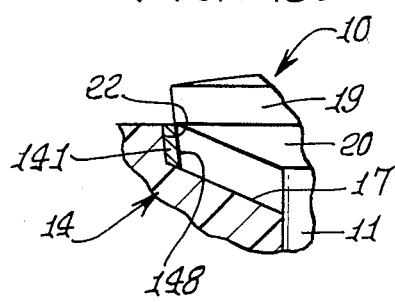

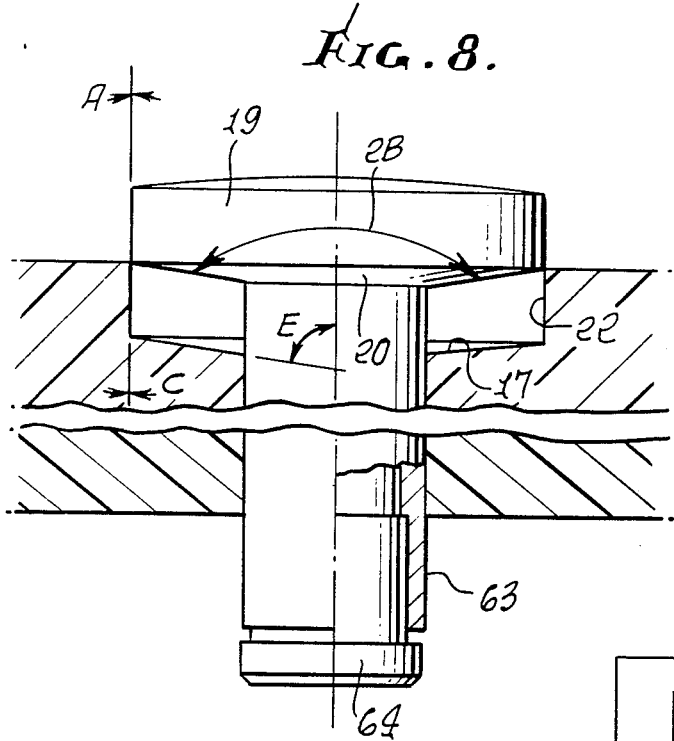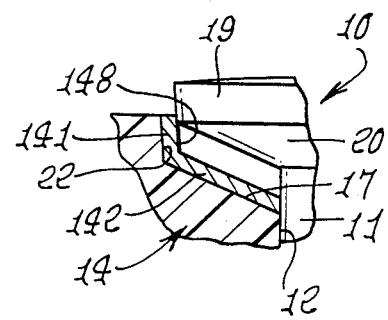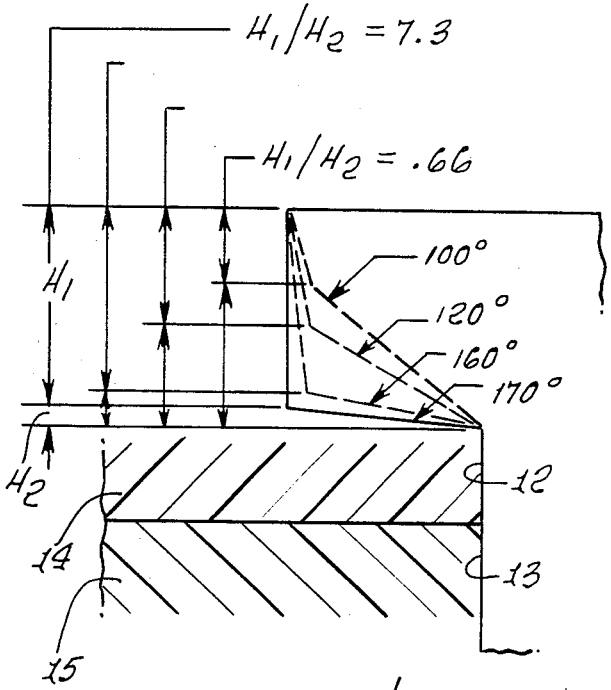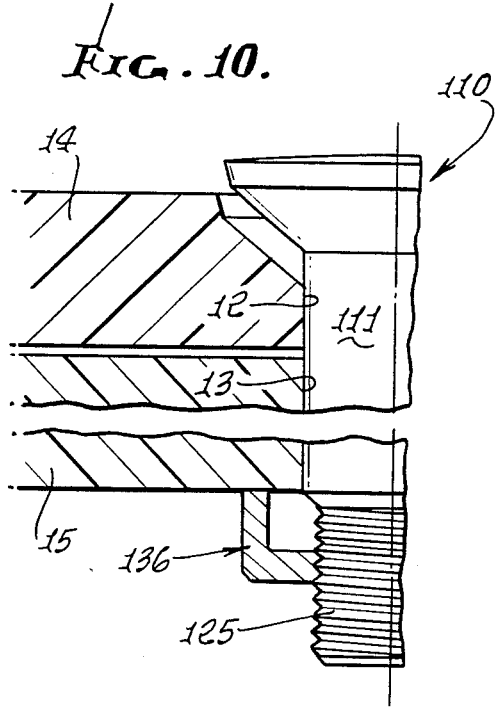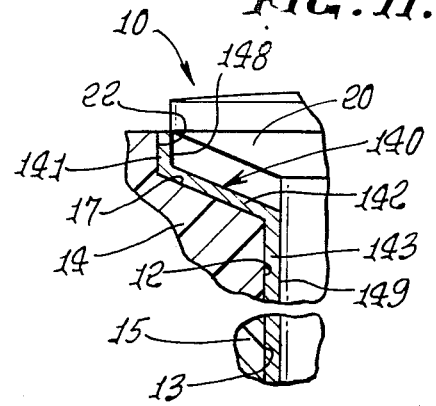

CORROSION RESISTANT DUAL TAPERED HEAD FASTENER AND PANEL COMPOSITE

BACKGROUND OF THE INVENTION

This invention relates generally to angle headed fasteners, and more particularly concerns the construction of such fasteners to overcome problems and defects stemming from fastener head and shank reception in non-metallic work bores and counterbores.

In the past, the use of angle headed fasteners to connect work panels, as for example aluminum, titanium or composite panels as employed in aircraft structures, has given rise to numerous problems. Among these were the practice of providing countersinks in the work slightly oversize in relation to the outer edges of the received fastener heads. The required removal of such material to produce the oversize countersinks resulted in undesirable notch sensitivity reduced shear bearing area, and decline of fatigue life of the structure. In this regard, most fasteners are designed to withstand shear loading, and in thin sheet applications the shear bearing area is reduced, magnifying the loading per square inch on the bearing area, thereby inducing sooner failure. Knife edge conditions associated with the countersink contribute to the problem. Also corrosion problems developed; for example, protective material filled into annular recesses about the heads tended to work loose during flexing of aircraft structures, so that corrosive fluids could gain access to the work bore along the fastener length, weakening the structure by producing corrosion and stress corrosion. Also, since the fastener head periphery does not completely engage the work bore due to the oversize relation, the development of desirable radial compression and peripheral tension in and within the elastic limits of the work material about the fastener head was not possible.

U.S. Pat. Nos. 3,849,964 and 4,370,081 disclose fasteners overcoming the above problems. Those fasteners incorporate a head having first and second tapered sections that provide interference engagement with the work counterbore, and in addition providing radial compression and peripheral tension in the work.

More recently non-metallic (as for example graphite or boron) work panels have been employed as in aircraft structures, to overcome corrosion problems and to ensure panel composite strength. Such panels may typically incorporate a myriad of graphite, boron or synthetic resin fibers or filaments extending lengthwise in the plane of a panel, representative filament diameters being between 0.0001 and 0.008 inches. Boron strands may for example be coated with silicon carbide, the result being known as "BORSIC". Organic matrices commonly used with boron or graphite filaments are modified epoxy resins, and organic resins such as polyamides and phenolics. Other examples are panels consisting of glass fiber, KEVLAR, polyester or epoxy resin. However, when fasteners are employed to interconnect such panels, and adjacent structure is subjected to high relative shear loading, it is found that load bearing bore surfaces and countersinks (through which the fasteners project) tend to deteriorate as represented by "powdering" of the bore surface material (i.e. the filament ends abrade). This is particularly a problem at more highly shear loaded surfaces, as at the reduced length bore surface which engages the fastener shank immediately fowardly of the fastener head. The problem becomes acute when the panels are subjected to vibratory shear loading, as is common in aircraft. A high interference fit as between the fastener and the non-metallic panel composite tends to cause and increase abrasion during installation, increasing the problem of powdering, i.e. excessive wear and degradation of the bore and countersink/counterbore surfaces in the work.

SUMMARY OF THE INVENTION

It is a major object of the invention to provide a fastener capable of overcoming the above problems, as well as increasing the shear bearing area and joint stability, and also providing unusual advantages as will appear.

Basically, the fastener is usable in combination with a non-metallic composite workpiece having at least two panels defining a bore and counterbore, the counterbore and a portion of said bore located in one panel, (a) the fasteners consisting of compatible and corrosion resistant material and having an axially extending shank received in and engageable with said bore and defining an axis, and the fastener typically having a flush, countersunk head, (b) the head having an end face, a first section located forwardly of said end face and a second forwardly tapered frustoconical section located forwardly of the first section, the included angle taper angularity of the second section being between about 100° and 170°, (c) the head first section having a side wall which has bearing engagement with a counterbore side wall of said workpiece to cooperate with bearing engagement of the shank with said workpiece bore to resist relative shear displacement and powdering of the panels.

As will appear, the interfit between the head first section side wall and the workpiece counterbore side wall is between 0.002 inches clearance and 0.006 inches interference, whereby powdering of the workpiece non-metallic material including filaments terminating at the bores and counterbores is minimized or eliminated under vibratory loading, the taper angularity 2B of the second section being within the 100°–170° range referred to.

Further, the above objectives are furthered by limiting the first section side wall taper A to the range 15° to 0°, A decreasing within that range as the taper angularity 2B of the second section is increased within its range 100° to 170°; also as the ratio $H_1/H_2$ of the height $H_1$ and $H_2$ of the first and second sections of the head decreases within the range 0.66 to 7.33 inches, the taper angularity 2B is decreased within its range.

Finally, the workpiece may include a sleeve engaged by the fastener, as will appear.

These and other objects and advantages of the invention, as well as the details of illustrative embodiments, will be more fully understood from the following description and drawings, in which:

DRAWING DESCRIPTION

FIGS. 5–8 are side elevations, partly in section, of fasteners and workpieces, and corresponding to various of the FIGS. 1–4 fasteners;

FIG. 9 is a head height diagram;

FIG. 10 shows a modified fastener; and

FIGS. 11–13 show further modifications.

DETAILED DESCRIPTION

Figure 1:
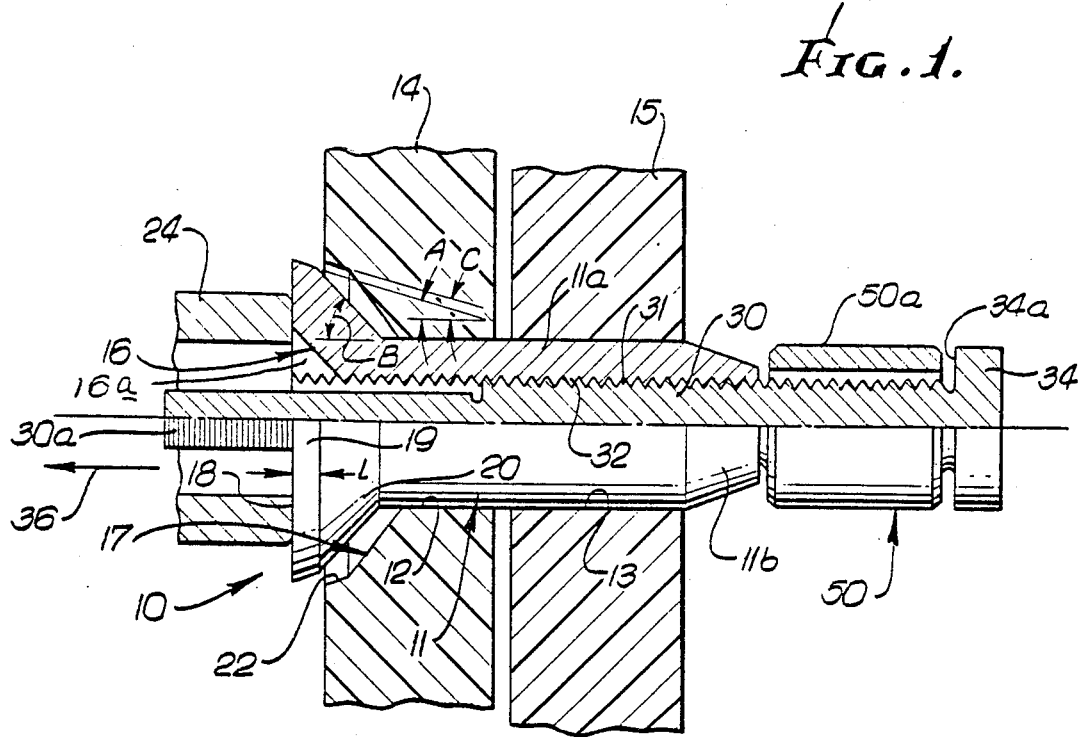
FIG. 1 is a side elevation, partly in section, showing a blind fastener embodying the invention after it has been partly inserted in a work structure bore.

In FIG. 1 the tubular fastener 10 has an axially extending tubular shank 11 receivable in bores 12 and 13 formed by work panels or sheets 14 and 15 to be interconnected. The fastener also has an annular head 16 receivable in forcible engagement with work material forming a tapered counterbore generally indicated at 17, and which is typically countersunk. The fastener may for example consist of metal such as alloy steel, aluminum or titanium or aluminum or titanium alloys, Monel, or other high temperature resistant alloys, or refractories; also the work panels such as aircraft skins consists of non-metallic sheets 14 and 15, as described above, and typically containing filaments of graphite, boron, BORSIC, glass fiber, non-metallic composites, or other material as referred to. Panel resin may consist of polyamide, phenolic, epoxide, and polyesters. At least one panel may be of laminated or honeycomb sandwich construction. Excessive "powdering" typically occurs, in the absence of the present invention, at bore 12, as at its entrance into panel 14, and also at the exit of bore 13 in panel 15.

The head 16 has an end face 18, a first forwardly tapered section 19 located immediately forwardly of the end face, and a second forwardly tapered section 20 located forwardly of the first section. The taper angularity B of the second section substantially exceeds the taper angularity A of the first section, so that when the shank is partially inserted into the work bore as seen in FIG. 1, and an impact is imparted to, or pressure exerted on, the head rear face, the head becomes seated as seen in FIG. 2.

A tubular driver to engage the the head is indicated generally at 24. The construction of the fastener may be such that it becomes fully seated, as seen in FIG. 2, in response to rotation of stem 30 until head seating at 17, and expansion of ring 50 to FIG. 2 position, as later described. The tubular shank 11 typically includes an elongated primary section 11a extending forwardly of the head second section 20, and a secondary section 11b which extends forwardly of the section 11a, and is forwardly tapered to be used for radially outwardly expanding the rearward portion 50a of the ring 50 for retaining the fastener in work panel connecting position as seen in FIG. 2.

For best results, and in regard to the fastener, the taper angularities A and C are typically about the same and may vary between 0° and 15°; when A is about 2° the length L of the first section 19 is about 0.140 inches; when A is about 15° the length L is about 0.010 inches (i.e the lesser the angle A, the greater the length L) and these two coordinates (2° and 0.140 inches, and 15° and 0.010 inches) define a line in a rectangular coordinate system which relates L to A.

Figure 2:
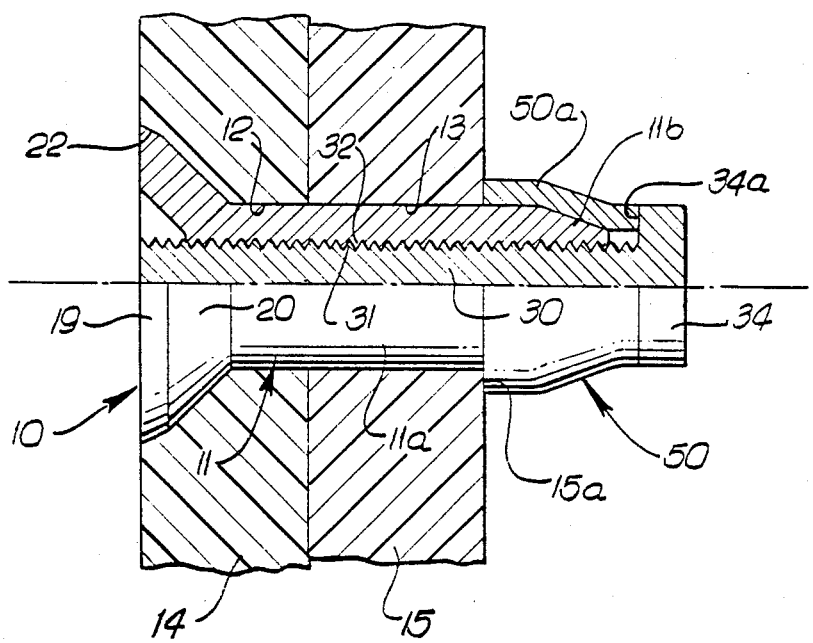
FIG. 2 is a view like FIG. 1, but showing the fastener after complete installation.

In addition, in FIG. 2 the head first section 19 typically has interfit with the counterbore surface 22 everywhere along the length of section 19, the total amount of such interfit being within the range of about 0.002 inches clearance and 0.006 inches interference; and the shank primary section 11a typically has engagement with the bores 12 and 13.

The fastener of FIG. 1 also includes a stem 30 extending through the tubular shank and annular head. It is shown as externally threaded at 31, threadably interengaging the bore thread 32 of the shank, whereby the stem may be retracted relative to the shank in response to rotation of the stem, after seating of he head as in FIG. 2, such seating providing a frictional interlock to resist rotation of the head and shank. Means is provided to be responsive to such retraction of the stem to expand at the protruding end of the fastener, for axially retaining the fastener in position with the head first section 19 frictionally locked to the counterbore 22. In this regard, a frictional interlock at 22 is sufficient to resist rotation of the head and shank, to resist or block rotation of the head and shank in response to torque application to the stem acting to retract the stem and radially expand ring 50. Accordingly, a corrosion proof seal is provided at 22, and the frictional interlock between 19 and 22 assists completion of the connection. In some cases, a holding device such as a Phillips recess shown at 16a is provided in the head to assist in preventing spin; but the required size of that recess is greatly reduced (strengthening the head) because of the interlock at 22.

The end of the stem remote from the head carries a flange 34 defining an annular shoulder 34a. The latter, upon rearward retraction of the stem, displaces the ring 50 toward and over the cam surface 11b on the shank to expand the ring, as seen in FIG. 2. Note that the outer diameter of shoulder 34d is less than the outer diameter of the head section 19. Arrow 36 indicates the direction of retraction of the stem, gripped at its reduced diameter, threaded end 30a.

It will be noted that the bearing areas (at 11, 12, 13, 19 and 22) act to position the fastener generally normal to the work as the latter is subjected to shear, to aid in resisting such shear, and to retain clamp-up. It should be noted that when the skin (i.e. panel) thickness is reduced to produce a "knife-edge" condition, the shear bearing ratio of section 19 is increased.

Figure 3:
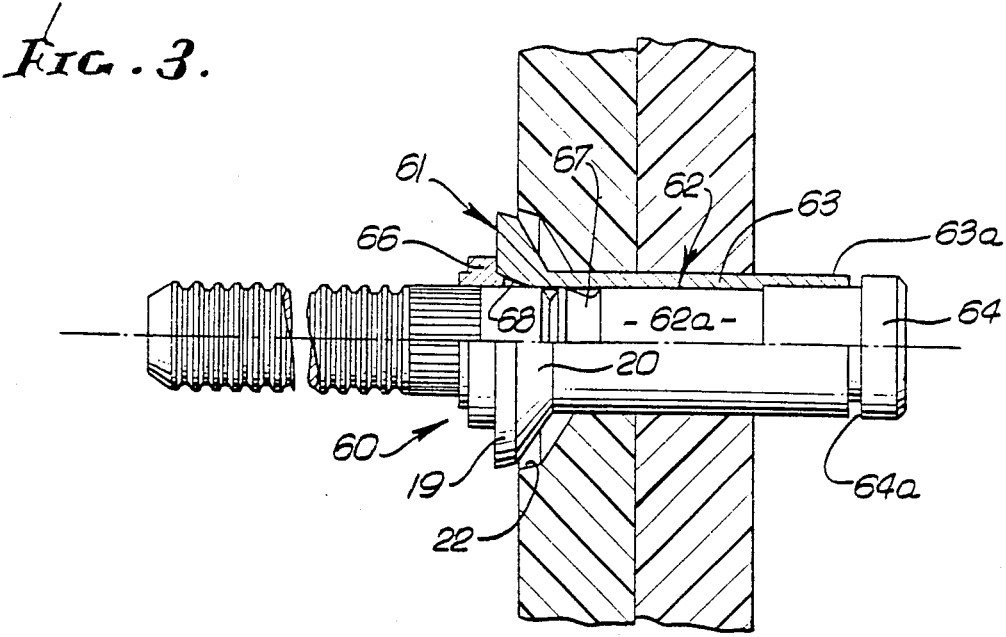
FIG. 3 is a side elevation, partly in section, showing a modified blind fastener incorporating the invention.
Figure 4:
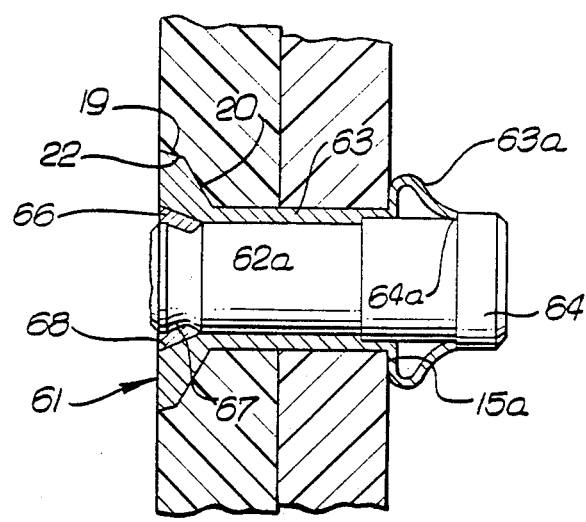
FIG. 4 is a sectional elevation of the FIG. 3 fastener after installation into a work bore.

In the fastener 60 of FIGS. 3 and 4, the structure of the annular head 61 remains the same as in FIGS. 1 and 2. Therefore, the same numbers are applied to the head and counterbore elements as in FIGS. 1 and 2, and seating of the head section 19 in tapered counterbore 22 and the head section 20 engaging countersink 17 is the same as previously described.

In this example, the extent 62a of the stem 62 within tubular shank 63 is not threaded, nor is the bore of the shank. The expansible means comprises a reduced wall thickness end portion 63a of the tubular shank, FIG. 4 showing that portion in buckled and expanded condition to axially retain the fastener in position. Buckled portion 63a engages the work surface 15a, as does the expanded ring portion 50a in FIG. 2. Flange 64 on the stem 62 has shoulder 64a engageable with shank end portion 63a to collapse same upon axial, rearward retraction of the stem relative to the shank. A locking collar 66 is deformed and wedges between groove 67 on the stem and the head tapered bore 68 to lock the stem to the head. Thus, collar 66 assists the interlock at 22, and the latter also assists locking of collar 66 in place.

The problems of loosening of blind fasteners and low fatigue life of work when such fasteners are used are solved, by providing a fastener with a head that cooperates with the work to provide an anchor locus which aids in maintaining the fastener generally perpendicular to the work, and also clamp-up. Also, the length of the bore 12 and 22 in panel 14 is maximized, to receive the shear loading on the bores, and thereby reduce the problem of powdering, as will be further described.

FIG. 5 shows a fastener of the type described in FIG. 1, the same elements bearing the same identifying numerals. In this example, the total taper angularily 2B of the fastener tapered section 20 is 100°. The taper angle A of the first section 19 is 15°; taper angle C of the work counterbore 22 is also 15°, and taper angle E of the work counterbore 17 is 50°. Interfit between tapered surfaces 19 and 22 is between 0.002 inches clearance and 0.006 inches interference. There is no interference between shank surface 11a and bores 12 and 13 of non-metallic (as for example graphite) panels 14 and 15.

The fastener head 10 is domed at 10a across its diameter, to assist in maintaining section 19 in controlled interfit with counterbore 22 to prevent or reduce powdering. When the fastener is fully inserted, the periphery of domed face 10a is flush with panel surface 14a.

FIG. 6 shows a fastener of the type described in FIG. 4, corresponding elements bearing the same numerals. In this case, the total angularity 2B of section 20 is 120°, and the taper angularity A of first section 19 is 11°. Angle C is also 11°, and angle E is 60°. Interfit between surfaces 19 and 22 is between 0.002 inches clearance and 0.006 inches interference. There is a no interference between shank surface 11a and bores 12 and 13 of non-metallic panels 14 and 15. A stabilizing strut 88 is also shown, and may attach to 64, as shown.

FIG. 7 is like FIG. 6, except that the angularities are as follows:

2B=160°
A=7°
C=7°
E=80°

FIG. 8 is like FIG. 6, except that the angularities are as follows:

2B=170°
A=0°
C=0°
E=85°

Also, the FIG. 8 fasterner has retention elements like those in FIG. 3, and bearing the same numerals.

For best results, the head height dimension $H_1$ increases relative to the dimension $H_2$, as 2B increases, and within the range $H_1/H_2$ as set forth below (and in FIG. 9).

From the foregoing, it is clear that as angle 2B increases, A decreases, and within the following ranges, A and $H_1/H_2$ varying as follows:

2B=100° to 170°
A=15° to 0°
$H_1/H_2$=about 0.60 to about 7.33

Representative values of $H_1$ and $H_2$ are approximately as follows, (see FIG. 9), based on a 3/16 inch shank diameter fastener.

|  | 2B = 100° | 2B = 170° |
| --- | --- | --- |
| $H_1$ | .020 inch | .044 inch |
| $H_2$ | .030 inch | .006 inch |
| $H_1/H_2$ | .66 inch | 7.3 inch |

A typical sheet 14 thickness for example is about 0.071 inches, the length of the bore portion 12 then being about 0.020 inches.

As $H_1$ increases and $H_2$ decreases, an increase in shear bearing area results, thereby stabilizing the fastener, inhibiting movement and powdering. Therefore, $H_1$ is preferably substantially greater than $H_2$.

FIG. 10 shows a fastener 110 like that of FIG. 5, excepting that it is not a blind fastener. Instead it has a rodlike shank 111 receivable in bores 12 and 13, and a threaded end 125 adapted to receive a nut indicated at 136 that engages thread 125 and work panel 15. Otherwise, the construction is as in FIG. 5.

The panels may be of laminated construction, or of honeycomb sandwich construction.

Referring now to FIGS. 11–13, the workpiece may be considered as including a sleeve carried by at least one of the panels, and defining at least one of the bore and counterbore engaged by the fastener. As shown in FIG. 11, the sleeve 140 has a first section 141 received or located in the panel counterbore 22, a second section 142 that engages panel tapered counterbore 17, and a third section 143 received or located in the panel bore or bores 12 and 13.

The sleeve thickness is between about 0.004 and 0.030 inches, and it may consist of material selected from the group: stainless steel, aluminum and alloys thereof, titanium and alloys thereof, rigid vinyl material, tetrafluorethylene copolymer, and NYLON. The sleeve may be inserted as a unit, or painted or sprayed on surfaces 22, 17, 12, and/or 13.

Thereafter, when the fastener 10 is inserted endwise into the installed sleeve, it typically has interference engagement with the sleeve (work) counterbore 148 and/or with the sleeve bore 149, so as to exert radially outward compressive loading on the sleeve, which is in turn exerted by the sleeve on the panel (or panels) counterbore 22 and bore or bores 12 and 13. Such interference with the sleeve is between 0.001 and 0.012 inches. Also, axial loading may be exerted by the fastener head forward tapered section 20 against sleeve second section 142 to axially load or compress the panel surface 17. Such sleeve transferred loading onto the panel or panels is of particular advantage when the panel or panels is or are non-metallic, as described herein, since initial abrasion or powdering of the panels in response to fastener insertion or installation is avoided (the sleeve having been previously installed in such manner as to avoid abrasion or powdering—as by lack of, or lack of appreciable interference between the sleeve and panel or panels at the time of sleeve installation).

In FIG. 12 the construction is the same as in FIG. 11, excepting that sleeve third section 143 is omitted. In this event, the fastener shank 11 directly engages the panel bore or bores 12 and 13.

In FIG. 13 the construction is the same as in FIG. 11, excepting that sleeve second and third sections are omitted. In this event, fastener shank 11 directly engages panel bore or bores 12 and 13, and fastener head surface 20 engages panel or work counterbore tapered surface 17 when the fastener is fully inserted, as described earlier.

Another version of the sleeve, implicitly shown in FIG. 11, would include sleeve sections 142 and 143 in position as seen, but section 141 would then be omitted, so that head section 19 would then be configured to directly and compressively engage the panel surface 22.

I claim:

1. In combination with a composite workpiece having at least two panels and defining a bore and a counterbore, the counterbore and a portion of the bore located in one panel, another portion of the bore located in another panel, (a) a corrosion resistant fastener having an axially extending shank received in and engageable with said bore and defining an axis, and the fastener having a flush countersink head, (b) the head having an end face, a first section located forwardly of said end face and a second forwardly tapered frusto-conical section located forwardly of the first section, the included angle taper angularity 2B of the second section being between 105° and about 170°, (c) the head first section having a side wall which has bearing engagement with a counterbore side wall of said workpiece to cooperate with bearing engagement of the shank with said workpiece bore to resist relative shear displacement of said panels, (d) the head first section side wall having taper angularity A within the range 15° to 0°, A being greater within said range as the taper angularity 2B of the second section is lower, within its range 105° to 170°, (e) said panels incorporating non-metallic filaments extending adjacent said bore portions, (f) the head first and second sections having heights $H_1$ and $H_2$ respectively, the ratio of $H_1$ to $H_2$ being within the range of about 1.0 to about 7.3, and said ratio decreasing within said range as 2B is lower within its range 105° to 170°, (g) said head end face being outwardly domed substantially completely across its diameter.

2. The combination of claim 1 wherein the head first section side wall and said workpiece counterbore side wall have interfit between 0.002 inches clearance to 0.006 inches inteference.

3. The combination of claim 1 wherein the workpiece counterbore side wall has taper angularity C, wherein C matches A for interfit.

4. The combination of claim 1 wherein said one panel has a thickness of about 0.071 inches.

5. The combination of claim 1 wherein said filaments consist essentially of material selected from the group that includes graphite, boron, BORSIC, glass fiber and non-metallic composites.

6. The combination of claim 1 wherein said panels consist of material selected from the group that includes graphite, boron, BORSIC, glass fiber and non-metallic composites.

7. The combination of claim 6 wherein said panels also include resin selected from the group that includes epoxide, polyamides, pheolics and polyester.

8. The combination of claim 1 including means acting on the shank to retain the head in said counterbore.

9. The combination of claim 8 wherein the shank is tubular, and said means includes structure extending within the tubular shank and exerting axial force thereon.

10. The combination of claim 1 wherein the fastener consists of corrosion resistant material.

11. The combination of claim 10 wherein said material is selected from the group that includes alloy steel, aluminum, titanium, aluminum alloy, titanium alloy, Monel, high temperature alloys and refractory materials.

12. The combination of claim 1 wherein $H_1$ is substantially greater than $H_2$.

13. The combination of claim 1, wherein at least one said panels is characterized as of laminated construction.

14. The combination of claim 1, wherein at least one of said panels is characterized as of honeycomb sandwich construction.

15. The combination of claim 8 wherein the shank is solid, and said means includes a nut on a threaded end of the shank.

16. The combination of claim 1 wherein the workpiece includes a sleeve carried by at least one of the panels and defining at least one of said bore and counterbore.

17. The combination of claim 16 wherein the sleeve defines both said bore and counterbore.

18. The combination of one of claims 16 and 17, wherein the counterbore has first and second sections of different frustoconical angularities, the sleeve defining at least one of said counterbore sections.

19. The combination of claim 16 wherein the sleeve has thickness between 0.004 and 0.030 inches.

20. The combination of one of claims 16, 17 and 19 wherein the sleeve consists essentially of material selected from the group consisting of stainless steel, aluminum and alloys thereof, titanium and alloys thereof, rigid vinyl material, tetrafluoroethylene copolymer, and NYLON.

21. The combination of claim 16 wherein the fastener has interference engagement with the sleeve between 0.001 and 0.012 inches.

* * * * *